April 21, 1953 P. T. FORD 2,635,614
FRUIT AND VEGETABLE WASHING MACHINE
Filed Oct. 3, 1946
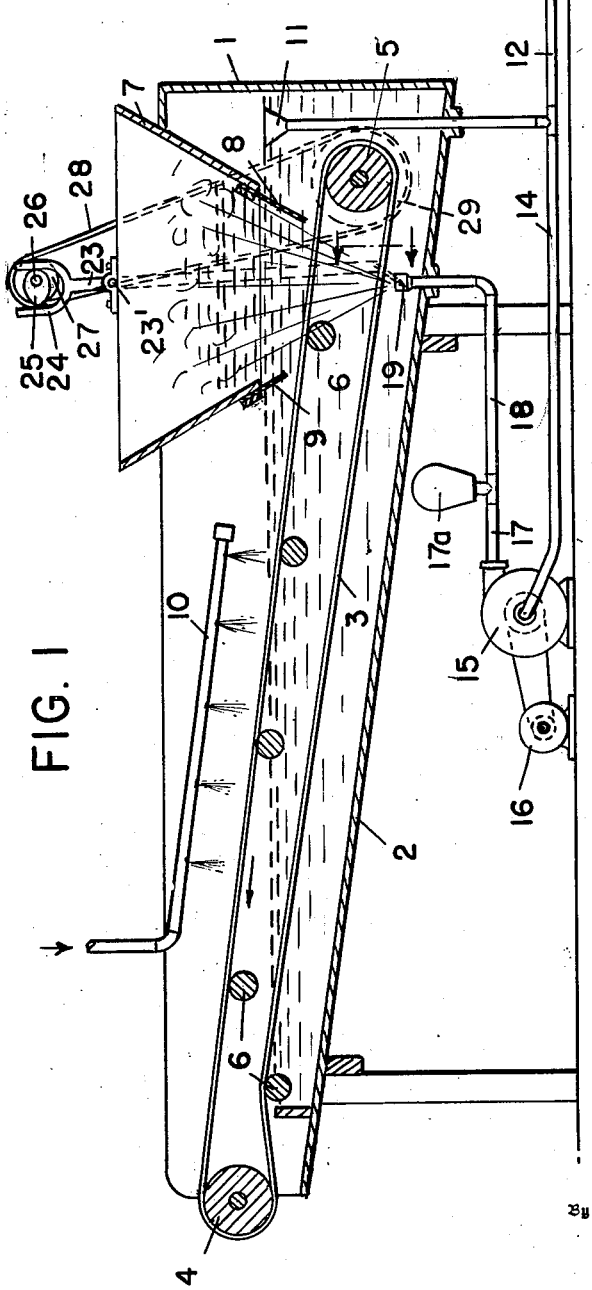
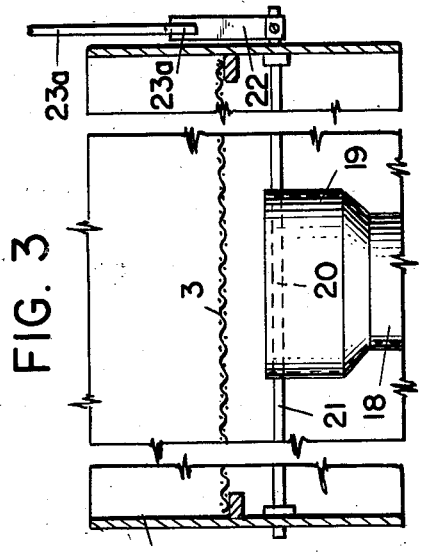
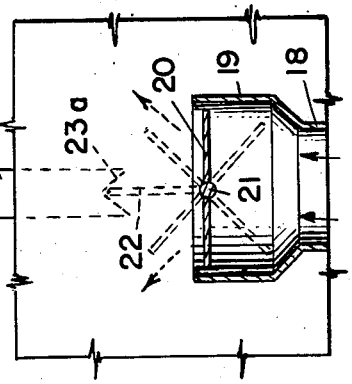
Inventor
P. T. FORD,
By Stone, Boyden & Mack,
Attorneys.

Patented Apr. 21, 1953

2,635,614

UNITED STATES PATENT OFFICE 2,635,614

FRUIT AND VEGETABLE WASHING MACHINE

Paul T. Ford, Dillon, S. C., assignor to Stansbury, Inc., Baltimore, Md., a corporation of Maryland Application October 3, 1946, Serial No. 700,944

4 Claims. (Cl. 134—130)

This invention relates to fruit and vegetable washers, and more particularly to washers of the type comprising a tank containing water into which the fruits or vegetables are fed, and equipped with means for agitating the water.

In washers of this kind it has been the common practice to provide mechanically driven stirrers or paddles for agitating the water, but it is found that such mechanical devices often bruise and damage the fruits and vegetables to a serious extent.

The primary object of the present invention, therefore, is to provide means for thoroughly agitating the water, but which cannot, under any circumstances, bruise or injure the fruits or vegetables being washed. To this end, I have devised means for agitating the water by delivering a high pressure jet of water from a submerged nozzle located near the bottom of the tank. More specifically, I have devised improved means for causing such a jet to periodically change its direction, thus producing pulsations or surges in the body of water in the tank. More specifically, also, I propose to produce the jet by pumping water from the overflow and delivering it under pressure, to said nozzle.

In order that the invention may be readily understood, reference is had to the accompanying drawings, forming part of this specification, and in which:

Fig. 1 is a longitudinal, vertical section through a conventional type of washer, showing my improved jet-producing means applied thereto;

Fig. 2 is a fragmentary, vertical section on an enlarged scale, showing my improved nozzle, and the controlling means therefor; and Fig. 3 is a similar view taken on a plane at right angles to that of Fig. 2, that is to say, a plane transverse to Fig. 1.

While not limited to such a machine, I have shown my improvements as applied to a washer having an elongated tank containing an endless conveyer on which the fruits and vegetables are deposited.

Referring to the drawings in detail, I designated an elongated tank or trough having an inclined bottom 2, and in which is mounted an endless conveyer 3, consisting of a foraminous band such as a perforated rubber belt or strip of woven wire, the latter being illustrated. This band is supported at its ends by rollers 4 and 5, around which it passes, and at spaced points along its length by suitable idlers 6. It will be noted that the runs of the conveyer are shown as substantially parallel with the inclined bottom of the tank, and that the lower end, where it passes around the roller 5, is submerged. Suitable means (not shown) for driving either the roller 4 or 5 is provided.

Mounted on the tank at a point just above the submerged end of the conveyer is a hopper 7 preferably having adjustable somewhat flexible curtains 8 and 9 projecting from the lower edge thereof toward the conveyer. By this arrangement, material dumped into the hopper is deposited and distributed on the travelling conveyer.

A water supply pipe 10 having a series of perforations therein, is disposed above and extends along the upper run of the conveyer, so as to spray water on the fruits or vegetables carried thereby. This water collects in the tank and escapes through the overflow pipe 11 and drain 12, controlled by a valve 13.

My improved attachment comprises a pipe 14, tapping the overflow pipe and extending to a suitable pump 15, shown as a centrifugal pump, driven as by means of a motor 16. The discharge pipe from said pump is connected with a jet pipe 18, an air chamber 17a preferably being arranged to communicate with said pipe so as to provide a uniform pressure. The jet pipe 18 extends upwardly through the bottom of the tank and carries at its upper end a nozzle 19, which is disposed beneath the submerged end of the conveyer, as shown in Fig. 1.

By reference to Figs. 2 and 3, it will be seen that I provide in the nozzle 19 a baffle 20 pivotally mounted at its center on a horizontal shaft 21. This shaft extends out through the side of the tank and has an arm 22 rigidly secured thereto. A lever 23 pivoted at 23' to a fixed support, as for example, the hopper, has a bifurcated lower end 23a which engages over the end of the arm 22.

The upper end of the lever 23 carries a fork 24, in which works a cam 25 secured to a shaft 26, mounted in a suitable support (not shown) and carrying a pulley 27. A belt 28 passes around this pulley and a pulley 29 on the shaft of the roller 5.

Thus, as the conveyer belt travels, and the roller 5 turns, the pulley 27 and cam 25 are rotated, and the lever 23 thus given an oscillating movement. This in turn imparts an oscillating movement to the arm 22, and rocks the shaft 21, thus swinging the baffle 20 alternately from side to side as indicated in dotted lines in Fig. 2.

It will thus be seen that the high pressure jet delivered in a generally upward direction from the submerged nozzle 19 is periodically caused to change its direction, that it to say, it is delivered alternately at an angle on opposite sides of a central vertical plane.

This oscillating jet has the effect of setting up pulsations or surges in the body of water in the tank, and if the speed at which the jet is caused to periodically change its direction is properly selected with relation to the natural period of oscillation of the body of water surrounding it, so that the effect of the impulses is cumulative, surges of great magnitude can be produced, thus thoroughly washing the fruits or vegetables in the tank. At the same time, there are no mechanically moving parts which can contact and damage the fruits or vegetables, the agitation or surging of the water in the tank being caused solely by hydraulic means.

As shown, the jets are so directed as to pass upwardly through the conveyer on which the material being washed is supported, and preferably at a point beneath the hopper, although the invention is not limited to this exact arrangement.

Also, instead of an oscillating baffle mounted in the nozzle as shown, other means for periodically changing the direction of the jet may be employed. For example, a simple nozzle, pivotally mounted so that it can be swung from side to side, might be employed.

It will be understood that my improved oscillating jet device is in the nature of an attachment which may be sold separately and applied to existing types of washers, to increase their efficiency.

What I claim is:

1. A fruit and vegetable washer comprising an elongated tank adapted to contain water, a foraminous travelling conveyer extending longitudinally of the tank and having one end submerged in the water, means for feeding material to be washed on to said conveyer, and means for directing a water jet generally upwardly through the submerged end of said conveyer from a point below the same.

2. A fruit and vegetable washer comprising an elongated tank adapted to contain water, a foraminous travelling conveyer extending longitudinally of the tank and having one end submerged in the water, a hopper for feeding material to be washed on to said conveyer, and means for directing a water jet generally upwardly through the submerged end of said conveyer from below the same at a point directly beneath said hopper.

3. A fruit and vegetable washer comprising an elongated tank adapted to contain water, a foraminous travelling conveyer having one end submerged in the water, means for feeding material to be washed on to said conveyer, a water supply pipe and overflow pipe for said tank, means for withdrawing water from said overflow pipe and returning it to said tank in the form of a generally upwardly directed jet positioned beneath the submerged end of said conveyer, and means for causing said jet to periodically shift its direction.

4. A fruit and vegetable washer comprising an elongated tank adapted to contain water, a foraminous travelling conveyer having one end submerged in the water, means for feeding material to be washed on to said conveyer, means for directing a water jet in a generally upward direction through the submerged end of said conveyer from a point beneath the same, and means for periodically changing the angle at which said jet is discharged.

PAUL T. FORD.

References Cited in the file of this patent

UNITED STATES PATENTS

| Number | Name | Date |
|---|---|---|
| 932,618 | Kunz | Aug. 31, 1909 |
| 952,734 | Haller | Mar. 22, 1910 |
| 1,215,596 | Wescott | Feb. 13, 1917 |
| 1,736,813 | Zuckerman | Nov. 26, 1929 |
| 1,877,816 | Cook | Sept. 20, 1932 |
| 1,992,261 | Traudt | Feb. 26, 1935 |
| 2,029,563 | Elkington | Feb. 4, 1936 |
| 2,111,285 | Haynie | Mar. 15, 1938 |
| 2,218,686 | Showers | Oct. 22, 1940 |
| 2,331,164 | Berger | Oct. 5, 1943 |
| 2,424,770 | Pedersen | July 29, 1947 |